United States Patent [19]

Ludwig et al.

[11] Patent Number: 5,302,406
[45] Date of Patent: Apr. 12, 1994

[54] METHOD OF INHIBITING BACTERIAL GROWTH IN MEAT

[75] Inventors: Wolfgang Ludwig, Highland, N.Y.; Siddik Iyimen, Neunkirchen, Fed. Rep. of Germany

[73] Assignees: WTI, Inc., New York, N.Y.; MYAC Fleischtechnologie GmbH, Meukirchen, Fed. Rep. of Germany

[21] Appl. No.: 983,636

[22] Filed: Dec. 1, 1992

[51] Int. Cl.⁵ .................. A23L 1/314; A23L 1/315; A23B 4/20
[52] U.S. Cl. ............... 426/281; 426/332; 426/335; 426/532; 426/641; 426/644
[58] Field of Search ........... 426/281, 332, 335, 532, 426/641, 644, 652

[56] References Cited

U.S. PATENT DOCUMENTS

| | | | |
|---|---|---|---|
| 2,117,478 | 5/1938 | Hall | 426/652 X |
| 3,065,084 | 11/1962 | Melnick et al. | 426/332 |
| 4,075,357 | 2/1978 | Szezesniak et al. | 426/332 |
| 4,476,112 | 10/1984 | Aversano | 426/332 X |
| 5,028,444 | 7/1991 | Yamamoto et al. | 426/652 X |
| 5,223,302 | 6/1993 | Coccodrilli et al. | 426/646 |

FOREIGN PATENT DOCUMENTS 47-37020  9/1972  Japan .................. 426/643

*Primary Examiner*—Arthur L. Corbin
*Attorney, Agent, or Firm*—Herbert Dubno; Jonathan Myers

[57] ABSTRACT

A method of inhibiting bacterial growth in meat wherein a citrate salt, preferably sodium citrate, is introduced into the meat to a sodium citrate content of 1 to 7% and preferably about 1 to 1.3%.

4 Claims, No Drawings

METHOD OF INHIBITING BACTERIAL GROWTH IN MEAT

FIELD OF THE INVENTION

Our present invention relates to a method of inhibiting bacterial growth in meat and, more particularly, to a method of improving the long term storage capacity for red meats and poultry.

BACKGROUND OF THE INVENTION

In U.S. Pat. Nos. 5,017,391, 4,888,191 and 4,798,729, as well as in the prior art described in these patents, it is pointed out that sodium lactate can be added to meat products such as ham and sausage in amounts of 1 to 3% to poultry and fish in an amount of 1 to 7% to improve the resistance of the meat to bacterial growth and particularly to control *Colstridium botulinum* which can occur in meats and poultries which are packaged and cooked, but not sterilized.

The *Colstridium botulinum* can grow in such meats and produce a toxin. As a consequence, it is desirable or necessary to somehow control the growth of bacteria in meat, including red meats such as hams, and poultry, or to sterilize the meat if the meat is to be subject to storage.

It should also be noted that citric acid and sodium citrate are generally recognized as safe in foodstuffs and are on the GRAS list issued by the Food and Drug Administration. Finally, mention should be made of the fact that sodium citrate in an amount up to 0.3% by weight of the meat, is approved as a curing accelerating. The sodium citrate can be added as a part of the curing process of cured meats such as ham.

Nevertheless, it is desirable to improve the appearance, flavor retention and storage life of meats and, specifically, to provide improved ways of limiting bacterial growth generally and the growth of *Colstridium botulinum* in particular.

OBJECTS OF THE INVENTION

It is the principal object of the present invention to provide an improved method of inhibiting bacterial growth in meat, both red meats and poultry and cured meats and noncured meats, with advantages over prior art systems.

Another object of the invention is to provide a method for the purposes described which eliminates the need to introduce sodium lactate into the meat.

Still another object of the invention is to provide a meat product with enhanced storage capacity and resistance to bacterial growth.

DESCRIPTION OF THE INVENTION

These objects and others which will become apparent hereinafter are attained, in accordance with the present invention in a method of inhibiting bacterial growth in red meat and poultry which comprises injecting the meat with an aqueous solution of sodium citrate to a sodium citrate level in the meat of 1 to 7% by weight and preferably 1 to 1.3% by weight thereof.

Advantageously the sodium citrate is in the form of a buffer solution of citric acid and sodium citrate in water which has been diluted for this purpose.

We have found, surprisingly, that at levels of about 1.2 to 1.3% of sodium citrate in the meat, the bacterial growth inhibition is equal to or better than that of sodium lactate and the properties of the meat are significantly better with respect to color, flavor retention and the like. Accordingly, the method of the invention provides a substantially improved meat product with comparatively long storage life, excellent inhibition of bacterial growth, especially with respect to *Colstridium botulinum*, without creating any health problems.

The sodium citrate solution is preferably injected at a solution concentration of sodium citrate which will not denature meat protein. While injection of the sodium citrate solution can be effected as a separate step, preferably the sodium citrate solution is added to the brine which may be injected into the meat or to the solution in which the meat is tumbled as part of a standard curing process for massaging into the meat. In that case, an aqueous solution containing 50% of saturation of sodium citrate, buffered with citric acid to a pH of 5.6, for example may be used as the tumbling solution.

In a preferred or best mode of operation, half of the sodium citrate added to the meat is injected with the brine, while the other half is massaged into the meat in the subsequent tumbling operation.

SPECIFIC EXAMPLE

A side by side comparative test was made with hams injected with sodium lactate (for comparison) in accordance with the examples used in U.S. Pat. No. 4,798,729 for turkey breasts, and hams injected with 1.2 to 1.3% sodium citrate by diluting a sodium citrate buffer solution containing citric acid and injecting the resulting solution.

The hams had substantially the same storage capacity and equivalent inhibition of Colstridium botulinum growth but the appearance and flavor retention of the hams containing the sodium citrate was significantly better than the equivalent properties of the ham containing the sodium lactate.

We claim:

1. A method of inhibiting bacterial growth and retaining flavor in red meat or poultry which comprises the step of injecting into the red meat or poultry a composition consisting essentially of an aqueous citrate solution containing 50% saturation of sodium citrate buffered with citric acid to a pH of 5.6, so that the sodium citrate content in the red meat or poultry is about 1.2 to 1.3% to reduce bacterial growth and retain flavor during storage of said red meat or poultry.

2. A processed red meat or poultry product, stabilized against bacterial growth and having retained flavor, produced by injecting into the red meat or poultry a composition consisting essentially of an aqueous citrate solution containing 50% saturation of sodium citrate buffered with citric acid to a pH of 5.6, so that the sodium citrate content in the red meat or poultry product is about 1.2 to 1.3%.

3. A method of inhibiting bacterial growth and retaining flavor in red meat or poultry which comprises the steps of (a) injecting into the red meat or poultry a composition consisting essentially of an aqueous citrate solution containing 50% saturation of sodium citrate buffered with citric acid to a pH of 5.6; and then (b) massaging the red meat or poultry, during a subsequent tumbling operation, with an additional composition consisting essentially of an aqueous citrate solution containing 50% saturation of sodium citrate buffered with citric acid to a pH of 5.6, so that the sodium citrate content in the red meat or poultry is about 1.2 to 1.3% to reduce bacterial growth and retain flavor during storage of said red meat or poultry.

4. A processed red meat or poultry product, stabilized against bacterial growth and having retained flavor, produced by injecting into the red meat or poultry a composition consisting essentially of an aqueous citrate solution containing 50% saturation of sodium citrate buffered with citric acid to a pH of 5.6, and then massaging the red meat or poultry, during a subsequent tumbling operation, with an additional composition consisting essentially of an aqueous citrate solution containing 50% saturation of sodium citrate buffered with citric acid to a pH of 5.6, so that the sodium citrate content in the red meat or poultry product is about 1.2 to 1.3%.

* * * * *